US012789347B2

(12) United States Patent
Westerby et al.

(10) Patent No.: US 12,789,347 B2
(45) Date of Patent: Nov. 10, 2026

(54) POWER TOOL INCLUDING A CIRCUIT FOR HOLDING A THERMAL REFERENCE

(71) Applicant: MILWAUKEE ELECTRIC TOOL CORPORATION, Brookfield, WI (US)

(72) Inventors: Carl B. Westerby, Menomonee Falls, WI (US); Samuel L. Bertz, Fox Point, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 271 days.

(21) Appl. No.: 18/428,024

(22) Filed: Jan. 31, 2024

(65) Prior Publication Data

US 2025/0073884 A1 Mar. 6, 2025

Related U.S. Application Data

(60) Provisional application No. 63/580,082, filed on Sep. 1, 2023.

(51) Int. Cl.

| | |
|---|---|
| ***B25F 5/00*** | (2006.01) |
| ***H01M 10/42*** | (2006.01) |
| ***H02J 7/00*** | (2026.01) |

(52) U.S. Cl.

CPC ......... *B25F 5/008* (2013.01); *H01M 10/4264* (2013.01); *H02J 7/855* (2026.01); *H01M 2010/4271* (2013.01)

(58) Field of Classification Search

CPC ....... B25F 5/008; B25F 5/00; H01M 10/4264; H01M 2010/4271; H01M 10/443; H01M 10/486; G01R 31/3842; G01R 31/367; G01R 31/389; H02K 5/24; H02J 7/0063; H02J 7/345; H02J 7/975; H02J 7/80; H02J 2207/50; H02J 7/445; H02J 7/855; H02P 29/60; H02P 29/68; H02P 29/025; H02P 23/0022; H02P 21/0017; H01G 11/10; G01K 7/427

See application file for complete search history.

(56) References Cited

U.S. PATENT DOCUMENTS 5,874,825 A * 2/1999 Brotto ..................... H02J 7/977 429/62
11,476,527 B2 10/2022 Sheeks et al.
11,652,437 B2 5/2023 Sheeks et al.

* cited by examiner

*Primary Examiner* — Antony M Paul
(74) *Attorney, Agent, or Firm* — Michael Best & Friedrich LLP

(57) ABSTRACT

Power tools including a housing, an electrical circuit, and the housing. The housing includes a battery pack interface configured to receive a battery pack. The electrical circuit includes a resistor-capacitor ("RC") circuit arrangement configured to store a voltage on a capacitor. The voltage is proportional to a temperature of the power tool. The electronic controller is connected to the electrical circuit and includes an electronic processor and a memory. The electronic controller is configured to control a voltage applied to the RC circuit arrangement, and determine, in response to determining a power off event of the power tool has ended, the temperature of the power tool based on the voltage of the capacitor of the RC circuit arrangement. The controller is also configured to control the power tool based on the voltage of the capacitor of the RC circuit arrangement and a temperature threshold.

20 Claims, 9 Drawing Sheets

600

POWER TOOL INCLUDING A CIRCUIT FOR HOLDING A THERMAL REFERENCE

RELATED APPLICATIONS

This application claims the benefit of U.S. Provisional Patent Application No. 63/580,082, filed Sep. 1, 2023, the entire content of which is hereby incorporated by reference.

FIELD

Embodiments described herein relate to a power tool.

SUMMARY

Portable pipe threaders include a stand and a carriage mounted to the stand having multiple pipe threading tools. These tools are usually a die holder including multiple dies, a cutter, and a reamer. Typically, a motor transmits torque to a spindle to which a pipe is clamped for rotating the pipe with respect to the tools. The motor receives power from a remote power source (e.g., via a power cord) and is usually controlled using a pedal, which upon actuation, triggers the motor to begin rotating the pipe. During operation, a thermal load of one or more components (e.g., motor, capacitor, gear box, etc.) of the pipe threader begins to rise and approach or exceed a thermal overload threshold of the pipe threader provided to protect a component of the pipe threader.

Embodiments described herein provide power tools including a housing, an electrical circuit, and the housing. The housing includes a battery pack interface configured to receive a battery pack. The electrical circuit includes a resistor-capacitor ("RC") circuit arrangement configured to store a voltage on a capacitor of the RC circuit arrangement. The voltage is proportional to a temperature of the power tool. The electronic controller is connected to the electrical circuit and includes an electronic processor and a memory. The electronic controller is configured to control voltage applied to the RC circuit arrangement, and determine, in response to determining a power off event of the power tool has ended, the temperature of the power tool based on the voltage of the capacitor of the RC circuit arrangement. The controller is also configured to control the power tool based on the voltage of the capacitor of the RC circuit arrangement and a temperature threshold.

Embodiments described herein provide methods for maintaining thermal information of a power tool during a power off event. The methods include receiving a voltage from a battery pack connected to the power tool, providing, by an electronic controller, the voltage from the battery pack to a resistor-capacitor ("RC") circuit arrangement. The RC circuit arrangement includes a capacitor storing a voltage that is proportional to a temperature of the power tool. The methods also include determining, by the electronic controller and in response to determining the power off event of the power tool has ended. The temperature of the power tool is based on the voltage of the capacitor of the RC circuit arrangement. The methods also include controlling the power tool based on the voltage of the capacitor of the RC circuit arrangement and a temperature threshold.

Embodiments described herein provide a system for maintaining thermal information of a power tool during a power off event. The system includes a battery pack, an electrical circuit, and an electronic controller. The electrical circuit includes a resistor-capacitor ("RC") circuit arrangement. The RC circuit arrangement is configured to store a voltage on a capacitor of the RC circuit arrangement. The voltage is proportional to a temperature of the power tool. The electronic controller is electrically connected to the electrical circuit. The electronic controller includes an electronic processor and a memory. The memory includes a model for an estimated temperature of the power tool. The estimated temperature of the model is proportional to the voltage of the capacitor of the RC circuit arrangement. The electronic controller is configured to control a voltage applied to the RC circuit arrangement. The electronic controller is further configured to determine a first voltage of the capacitor of the RC circuit arrangement. The first voltage is an initial voltage measurement. The electronic controller is further configured to determine a first estimated temperature of the power tool based on the first voltage of the capacitor of the RC circuit arrangement, update a state of the model based on the first voltage of the capacitor of the RC circuit arrangement, determine, in response to determining the power off event of the power tool ended, a second voltage of the RC circuit arrangement, determine a second estimated temperature of the power tool based on the second voltage of the capacitor of the RC circuit arrangement, and control operation of the power tool based on the second estimated temperature of the power tool and a temperature threshold value.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the embodiments will become apparent by consideration of the detailed description and accompanying drawings.

DETAILED DESCRIPTION

This disclosure relates to maintaining thermal information of a power tool during a power off event. Embodiments of the present disclosure recognize that maintaining thermal information of a power tool can be achieved with an onboard battery (e.g., a coin cell) and a thermistor for components of the power tool where a temperature is modelled or an overload is added. A coin cell may be employed to provide power to store thermal information when a main battery pack of a power tool is removed from the power tool. However, various embodiments of the present disclosure recognize that challenges exist with initializing thermal overloads because the power tool loses ability to continue to model once the battery pack is removed. Thus, the models would produce inaccurate temperatures due to using initial conditions that fail to consider the cooling factor of the power tool when the battery pack is reconnected. Embodiments of the present disclosure solve these challenges with the use of a circuit (e.g., a resistor-capacitor ["RC"] circuit) that allows the power tool to store thermal information (e.g., temperature starting points) as a voltage of a capacitor of the RC circuit without use of an onboard battery cell. The circuit can also take a cooling factor of the power tool into consideration. Additionally, embodiments disclosed herein prevent a user from circumventing thermal protections of the power tool by merely power cycling the power tool.

Figure 1:
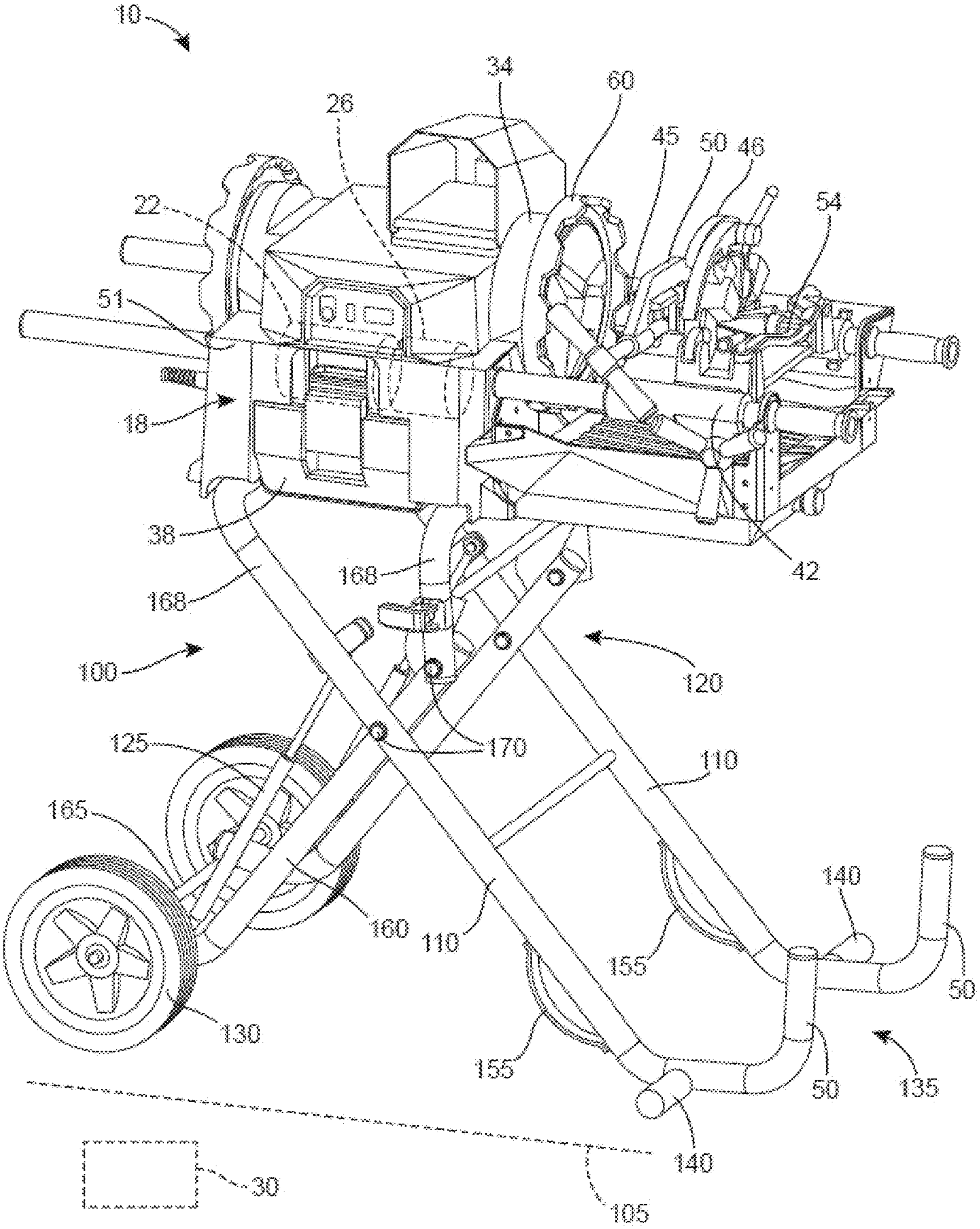
FIG. 1 is a perspective view of a power tool, according to embodiments described herein.

In some embodiments, the present disclosure can be implemented in a power tool. FIG. 1 illustrates a power tool 10, such as a portable pipe threader 10, for implementing the features of the present disclosure. Although the present disclosure is discussed with respect to a portable pipe threader 10, the present disclosure can be implemented using any of a variety of power tools without departing from the scope of the present disclosure. For example, the present disclosure can be implemented in any of a cutting tool, a drilling tool, a fastening tool, a lawncare tool, a lighting accessory, a power supply, etc.

With reference to FIG. 1, the portable pipe threader 10 includes a stand 100 and a main housing 51 supported on the stand 100, and a carriage 42 supported on the main housing 51 having a plurality of pipe threading tools 46, 50, 54 supported by the carriage 42. The pipe threader 10 further includes a drive assembly 18 housed within the main housing 51 and mounted to the stand 100 having a motor 22 (e.g., a brushless direct current electric motor), a gear box 26 coupled to the motor 22 having an output gear (not shown), an electronic speed selection switch, such as a pedal 30, that selectively controls the drive assembly 18, and a plurality of guide rails 45 configured to support the carriage 42. The drive assembly 18 is powered by a battery pack 38 supported by the stand 100 in selective electrical communication with the motor 22 to provide electrical power to the motor 22.

In some constructions, the battery pack 38 and the motor 22 can be configured as an 18 Volt high power battery pack and motor, such as the 18 Volt high power system disclosed in U.S. Pat. No. 11,476,527, issued on Oct. 18, 2022, the entirety of which is incorporated herein by reference. In other constructions, the battery pack 38 and the motor 22 can be configured as an 80 Volt high power battery pack and motor, such as the 80 Volt battery pack and motor disclosed in U.S. Pat. No. 11,652,437, issued on May 16, 2023, the entirety of which is incorporated herein by reference. In such a battery pack 38, the battery cells within the battery pack 38 have a nominal voltage of up to about 80 V. Further, in another embodiment, the battery cells within the battery pack 38 have a nominal voltage of up to about 120 V. In some embodiments, the battery pack 38 has a weight of up to about 6 lb. In some embodiments, each of the battery cells has a diameter of up to 21 mm and a length of up to about 71 mm. In some embodiments, the battery cells within the battery pack 38 are cylindrical battery cells, prismatic battery cells, pouch battery cells, or a combination thereof. In some embodiments, the battery pack 38 includes up to twenty battery cells. In other embodiments, the battery pack 38 includes up to thirty battery cells, up to forty battery cells, up to forty-five battery cells, or greater. In some embodiments, the battery cells are disposed in a single battery pack. In other embodiments, the battery cells are disposed in multiple packs, i.e., two packs, three packs, four packs, etc. In some embodiments, the battery cells are connected in series. In some embodiments, the battery cells are operable to output a sustained operating discharge current of between about 20 A and about 140 A, for example, about 40 A and about 60 A. In some embodiments, each of the battery cells has a capacity of between about 1.7 Ah and about 15.0 Ah. And, in some embodiments of the motor 22 when used with the 80 Volt battery pack 38, the motor 22 has a power output of at least about 2760 W and a nominal outer diameter (measured at the stator) of up to about 80 mm, up to about 100 mm, up to about 120 mm, up to about 140 mm, or greater.

With reference to FIG. 1, the drive assembly 18 further includes a drive element 34 (e.g., a drive tube) coupled to the gear box 26 and powered by the motor 22. The motor 22 is configured to supply torque to the output gear of the gear box 26 and rotatably drive the drive element 34 to rotate a pipe (not shown) or a selected one of the plurality of pipe threading tools. The pedal 30 is operable to activate the motor 22 and control a relative speed at which the pipe rotates. In other embodiments, the relative speed at which the pipe rotates can be selected using an electronic speed selection switch other than the pedal 30 (e.g., dial, keypad, button, etc.).

With continued reference to FIG. 1, the portable pipe threader 10 further includes a spindle 60 in which the pipe is clamped. The drive element 34 interconnects the spindle 60 and the output gear of the gear box 26. Thus, torque from the motor 22 is transferred to the spindle 60, causing it and the pipe to rotate, via the gear box 26 and the drive element 34. With reference to FIG. 1, the plurality of pipe threading tools 46, 50, 54 includes a die holder 46 having a plurality of dies (not shown) to cut threads on the pipe, a pipe cutter 50 to trim excess pipe, and a pipe reamer 54 to deburr, or otherwise smooth, an inner edge of a cut end of a pipe. The plurality of pipe threading tools 46, 50, 54 remain stationary on the carriage 42 while the pipe is rotated by the spindle 60. In some embodiments, the portable pipe threader 10 also includes a lubrication system configured to provide lubricant to the pipe during a threading operation using the die holder 46 and a particular die (not shown) installed therein.

With continued reference to FIG. 1, the stand 100 includes an upright portion 168 configured to support the threader 10 and a stand locking mechanism 120 for selectively locking the stand 100 in a deployed state and a collapsed state. The stand 100 further includes a plurality of first and second support legs 110, 160 pivotably coupled via rotatable joints 170 (e.g., bolts, screws, etc.), an axle 165 pivotably coupled to the second support legs 160 having a plurality of wheels 130, a plurality of lift-assist springs 125 for aiding the stand 100 from moving from the collapsed state to the deployed state, and a handle assembly 135 integrated with the first support legs 110 having feet portions 140 to support the threader 10 in the deployed state where the threader 10 is elevated from a work surface 105 during use. The handle assembly 135 further includes grip portions 150 for the user to grasp the stand 100 during transport of the threader 10 and loading skis 155 coupled to the first support legs 110 for allowing the stand 100 to travel more easily over difficult surfaces when it is being transported (e.g., being pulled up stairs).

In other embodiments, the power tool 10 is a different type of power tool. For example, the power tool 10 may be an impact wrench, a ratchet, a saw, a hammer drill, an impact driver, a rotary hammer, a grinder, a blower, a trimmer, etc. In this example, the power tool 10 may also be associated with a class of power tools, such as, vacuums, string trimmers, blowers, drills, saws, lights, power edgers, general trimmers, chainsaws, table saws, miter saws, reciprocating saws, powered sprayers, air compressors, outdoor power equipment, etc. In some embodiments, the power tool 10 is a power supply device or power source that receives one or more battery packs 38.

Figure 2:
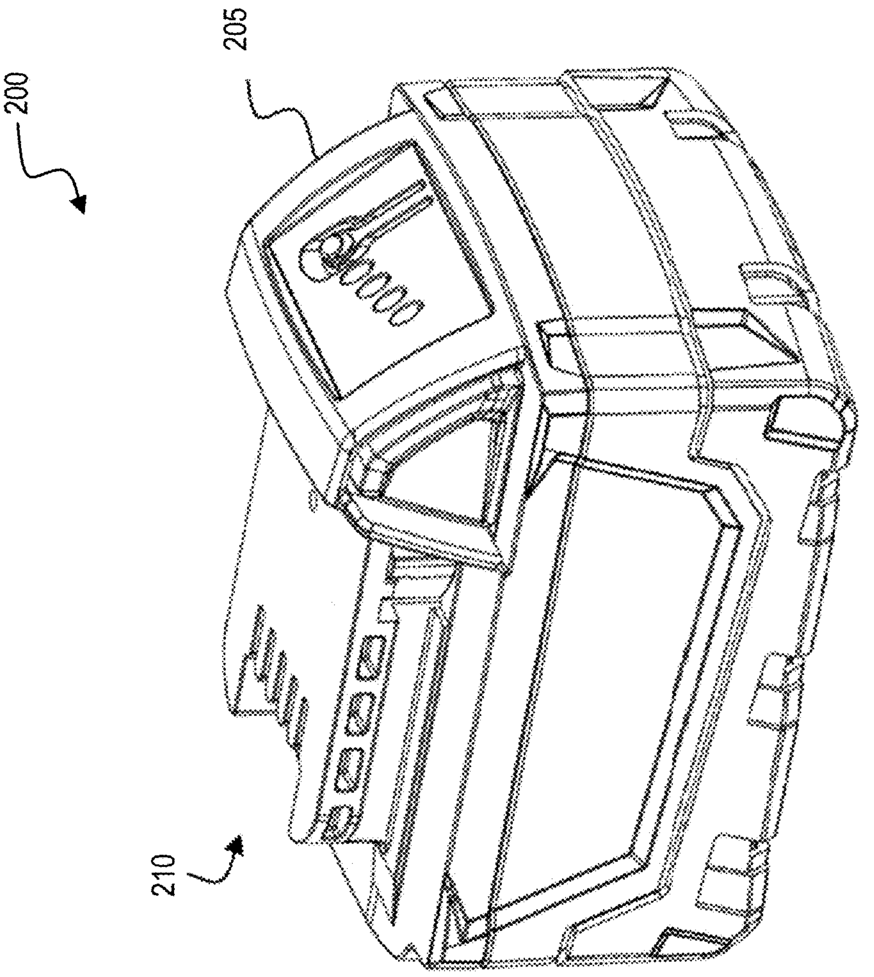
FIG. 2 illustrates a battery pack for the power tool of FIG. 1, according to embodiments described herein.

Referring to FIG. 2, a battery pack 200, such as the battery pack 38 shown in FIG. 1, including a housing 205 and battery pack interface 210 for connecting the battery pack 200 to a device (e.g., the power tool 10) is depicted. The discharge of the battery pack 200 can be controlled by any combination of a battery pack controller, a power tool, a battery pack charger, etc., as provided by the present disclosure. The battery pack 200 can be an 18-volt or 36-volt battery pack, although other voltages between 12-volts and 120-volts are contemplated. The battery pack interface 210 includes a combination of mechanical components (e.g., rails, grooves, latches, etc.) and electrical components (e.g., one or more terminals) configured to and operable for interfacing (e.g., mechanically, electrically, and communicatively connecting) the power tool 10 with the battery pack 200. For example, power provided by the battery pack 200 to the power tool 10 is provided through the battery pack interface 210 to a power input of the power tool 10. The battery pack interface 210 also supplies power to pulse-width modulation (PWM) drivers for selectively providing power to a motor of the power tool 10. The battery pack interface 210 also includes, for example, a communication line for providing a communication line or link between a controller and the battery pack 200.

Figure 3:
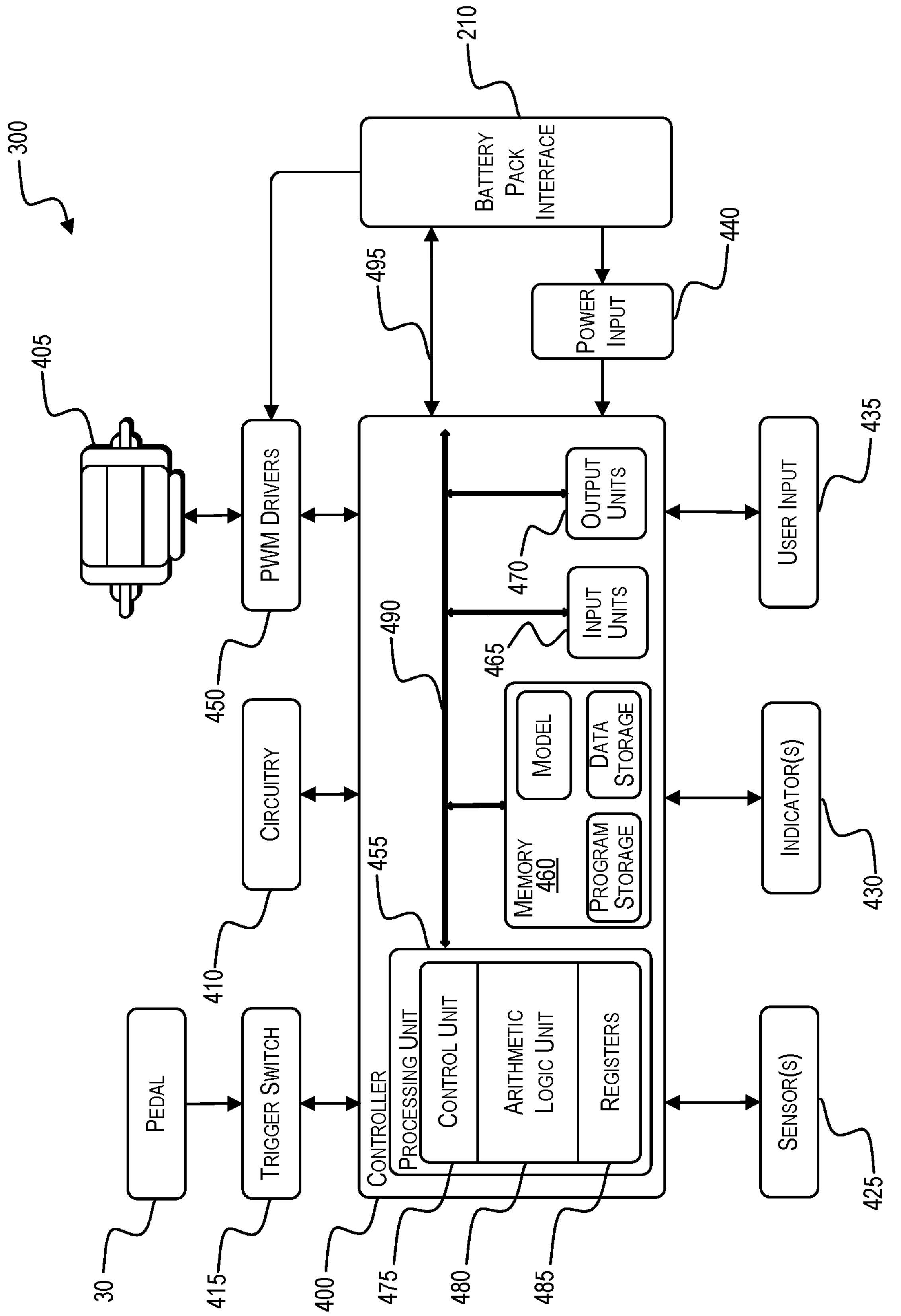
FIG. 3 illustrates a control system for the power tool of FIG. 1, according to embodiments described herein.

FIG. 3 illustrates an example control system 300 for a power tool (e.g., the power tool 10). The control system 300 includes a controller 400 electrically and/or communicatively connected to a variety of modules or components of the power tool 10. For example, the illustrated controller 400 is electrically connected (e.g., directly, indirectly through sub circuits, etc.) to a motor 405, a battery pack interface 210, circuitry 410, a trigger switch or switch 415 (connected to the pedal 30), one or more sensors 425 or sensing circuits (e.g., one or more current sensors, one or more speed sensors, one or more Hall Effect sensors, one or more temperature sensors, etc.), one or more indicators 430, a user input module 435, a power input module 440, and PWM drivers 450 (e.g., a field effect transistor [FET] in a bridge configuration module including a plurality of switching FETs). The controller 400 includes combinations of hardware and software that are operable to, among other things, control the operation of the power tool 10, monitor the operation of the power tool 10, activate the one or more indicators 430 [e.g., light emitting diodes (LEDs)], etc.

In some embodiments, the controller 400 includes a plurality of electrical and electronic components that provide power, operational control, and protection to the components and modules within the controller 400 and/or the power tool 10. For example, the controller 400 includes, among other things, a processing unit 455 (e.g., a microprocessor, a microcontroller, an electronic processor, an electronic controller, or another suitable programmable device), a memory 460, input units 465, and output units 470. The processing unit 455 includes, among other things, a control unit 475, an arithmetic logic unit ("ALU") 480, and a plurality of registers 485 (shown as a group of registers in FIG. 3), and is implemented using a known computer architecture (e.g., a modified Harvard architecture, a von Neumann architecture, etc.). The processing unit 455, the memory 460, the input units 465, and the output units 470, as well as the various modules or circuits connected to the controller 400 are connected by one or more control and/or data buses (e.g., common bus 490). The control and/or data buses are shown generally in FIG. 3 for illustrative purposes. The use of one or more control and/or data buses for the interconnection between and communication among the various modules, circuits, and components would be known to a person skilled in the art in view of the disclosure described herein.

The memory 460 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, SSD, an SD card, or other suitable magnetic, optical, physical, or electronic memory devices. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the power tool 10 can be stored in the memory 460 of the controller 400. The software includes, for example, firmware, one or more applications, program data, filters, models, rules, one or more program modules, and other executable instructions. The controller 400 is configured to retrieve from the memory 460 and execute, among other things, instructions related to the control processes and methods described herein. In other constructions, the controller 400 includes additional, fewer, or different components.

The battery pack interface 210 includes a combination of mechanical components (e.g., rails, grooves, latches, etc.) and electrical components (e.g., one or more terminals) configured to and operable for interfacing (e.g., mechanically, electrically, and communicatively connecting) the power tool 10 with a battery pack (e.g., battery pack 38, 200). For example, power provided by the battery pack to the power tool 10 is provided through the battery pack interface 210 to the power input module 440. The power input module 440 includes combinations of active and passive components to regulate or control the power received from the battery pack prior to power being provided to the controller 400. The battery pack interface 210 also supplies power to the PWM drivers 450 to selectively provide power to the motor 405. The battery pack interface 210 also includes, for example, a communication line 495 to provide a communication line or link between the controller 400 and the battery pack.

The circuitry 410 is an electrical circuit, including a combination of electrical components (e.g., passive component devices, resistors, capacitors) configured to and operable for storing power information (e.g., thermal information) received from the controller 400. In some embodiments, the circuitry 410 includes a resistor-capacitor ("RC") circuit. The RC circuit includes resistors and capacitors, and is operable by a power source (e.g., current source or voltage source). An RC time constant of the RC circuit is measured in seconds and is equal to the product of the circuit resistance (in ohms) and the circuit capacitance (in farads). The capacitor stores energy, and the resistor of the RC circuit controls a rate of charging and discharging of the capacitor. The rate of charging of the capacitor of the RC circuit from an initial charge voltage of zero to a defined value (e.g., approximately 63.2% of the value of an applied DC voltage) or the rate of discharging of the capacitor of the RC circuit through the same resistor to a defined value (e.g., approximately 36.8% of its initial charge voltage) is based on an RC time constant of the RC circuit.

Figure 4:
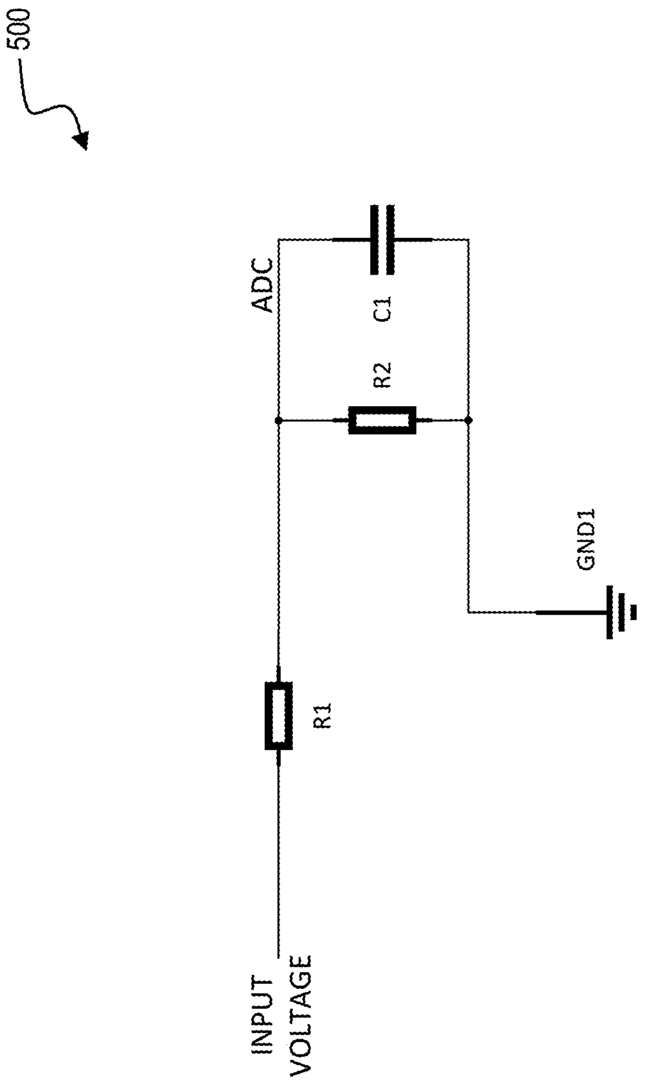
FIG. 4 illustrates a circuit diagram for storing thermal information of the power tool of FIG. 1, according to embodiments described herein.
Figure 5:
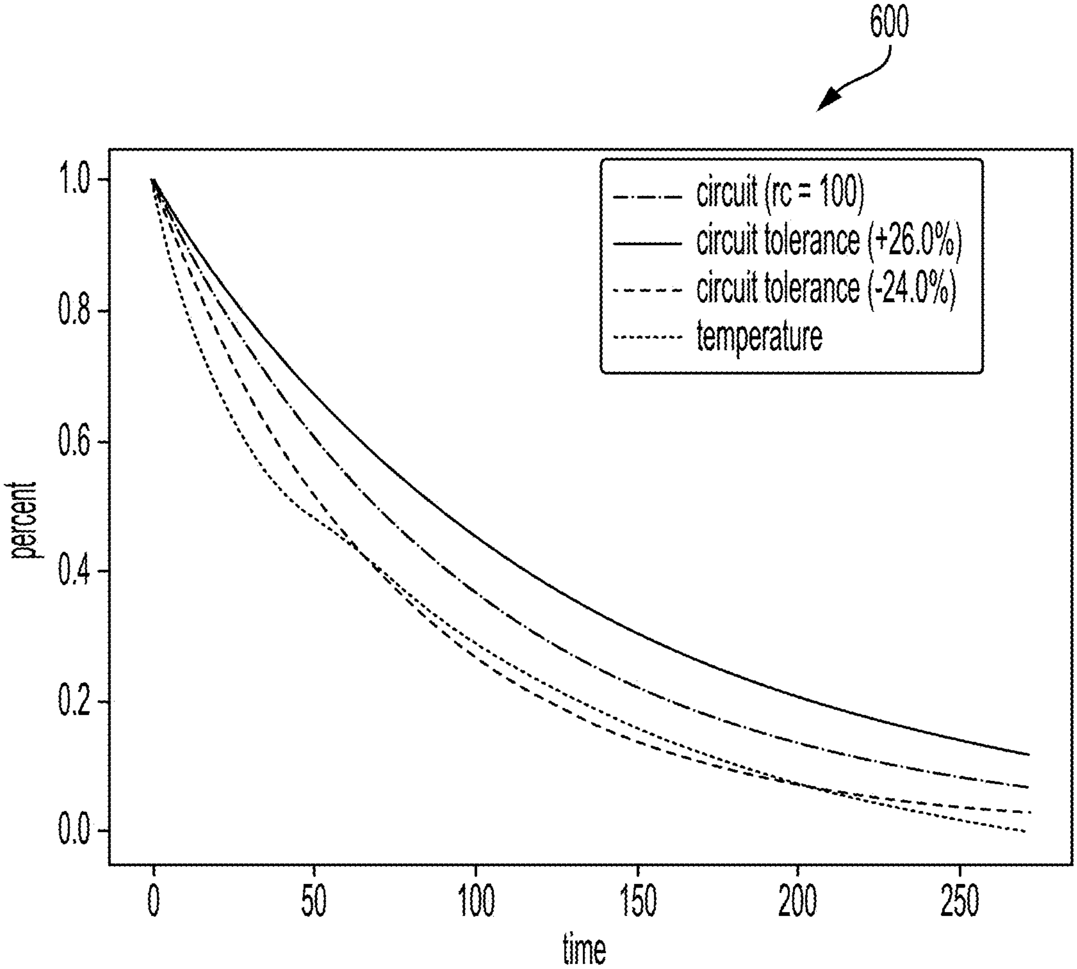
FIG. 5 depicts a graph of modelling data for the power tool of FIG. 1, according to embodiments described herein.

In some embodiments, the resistor-capacitor ("RC") circuit includes a circuit arrangement, for example, as depicted in FIG. 4. Referring to FIG. 4, an example RC circuit arrangement 500 is depicted for storing thermal information of the power tool 10 of the present disclosure. In some embodiments, the RC circuit arrangement 500 includes an input voltage, a resistor R1, a resistor R2, a capacitor C1, a ground GND1. The resistor R1 is connected between the input voltage and the capacitor C1 in a series-type connection. The resistor R2 is connected in a parallel-type connection with the capacitor C1 between the resistor R1 and the capacitor C1. In some implementations, the resistor R2 is a pull-down resistor and is configured to influence a time constant of the RC circuit arrangement 500. In some embodiments, a resistance of the resistor R2 is set to configure a discharge rate (e.g., voltage decay rate) of the capacitor C1 of the RC circuit arrangement 500 to match a cooling off rate of the power tool 10 or a component of the power tool 10, for example, as depicted in FIG. 5. Referring to FIG. 5, an example graph 600 is depicted illustrating a proportional relationship between the cooling off rate of the power tool 10 and the voltage decay rate of the RC circuit arrangement 500. The graph 600 includes plots of a temperature of the power tool 10 cooling off over time, a voltage decay rate (e.g., discharge rate) of the capacitor C1 with a RC time constant of the RC circuit arrangement 500 equal to one hundred (100) seconds, and circuit tolerances of the RC circuit arrangement 500. The graph 600 plots a percent value on a y-axis against time on an x-axis.

The indicators 430 include one or more visual, audio or haptic feedback devices to provide feedback to a user as to the status of the power tool 10. For example, indicators 430 can include one or more light-emitting diodes ("LEDs"). The indicators 430 can be configured to display conditions of, or information associated with, the power tool 10. For example, the indicators 430 are configured to indicate measured electrical characteristics of the power tool 10, a temperature of the power tool 10, etc. The user input module 435 is operably coupled to the controller 400 to, for example, select a forward mode of operation or a reverse mode of operation, a torque and/or speed setting for the power tool 10 (e.g., using torque and/or speed switches), etc. In some embodiments, the user input module 435 includes a combination of digital and analog input or output devices required to achieve a desired level of operation for the power tool 10, such as one or more knobs, one or more dials, one or more switches, one or more buttons, one or more touch or pressure sensitive sensors, etc.

The controller 400 controls operation of the power tool 10 using the circuitry 410 and a temperature threshold of the power tool 10. The controller 400 applies a voltage, proportional to a temperature, as a percentage of defined temperature to the circuitry 410 during operation of the power tool 10. The controller 400 is configured to determine a temperature of the power tool 10 using a stored voltage of the circuitry 410. Although the controller 400 is illustrated in FIG. 3 as one controller, the controller 400 could also include multiple controllers configured to work together to achieve a desired level of control for the power tool 10. As such, any control functions and processes described herein with respect to the controller 400 could also be performed by two or more controllers functioning in a distributed manner.

In some embodiments, the controller 400 disables operation of the power tool 10, when the controller 400 determines that the temperature of the power tool 10 exceeds the temperature threshold. The controller 400 disables the power tool 10 to prevent damage to components due to an overload indicated by the temperature threshold being exceeded. For example, the controller 400 utilizes a temperature threshold and a temperature of the power tool 10 to control a thermal overload switch (e.g., a FET, a relay, etc.) connected to the motor 405.

Figure 6:
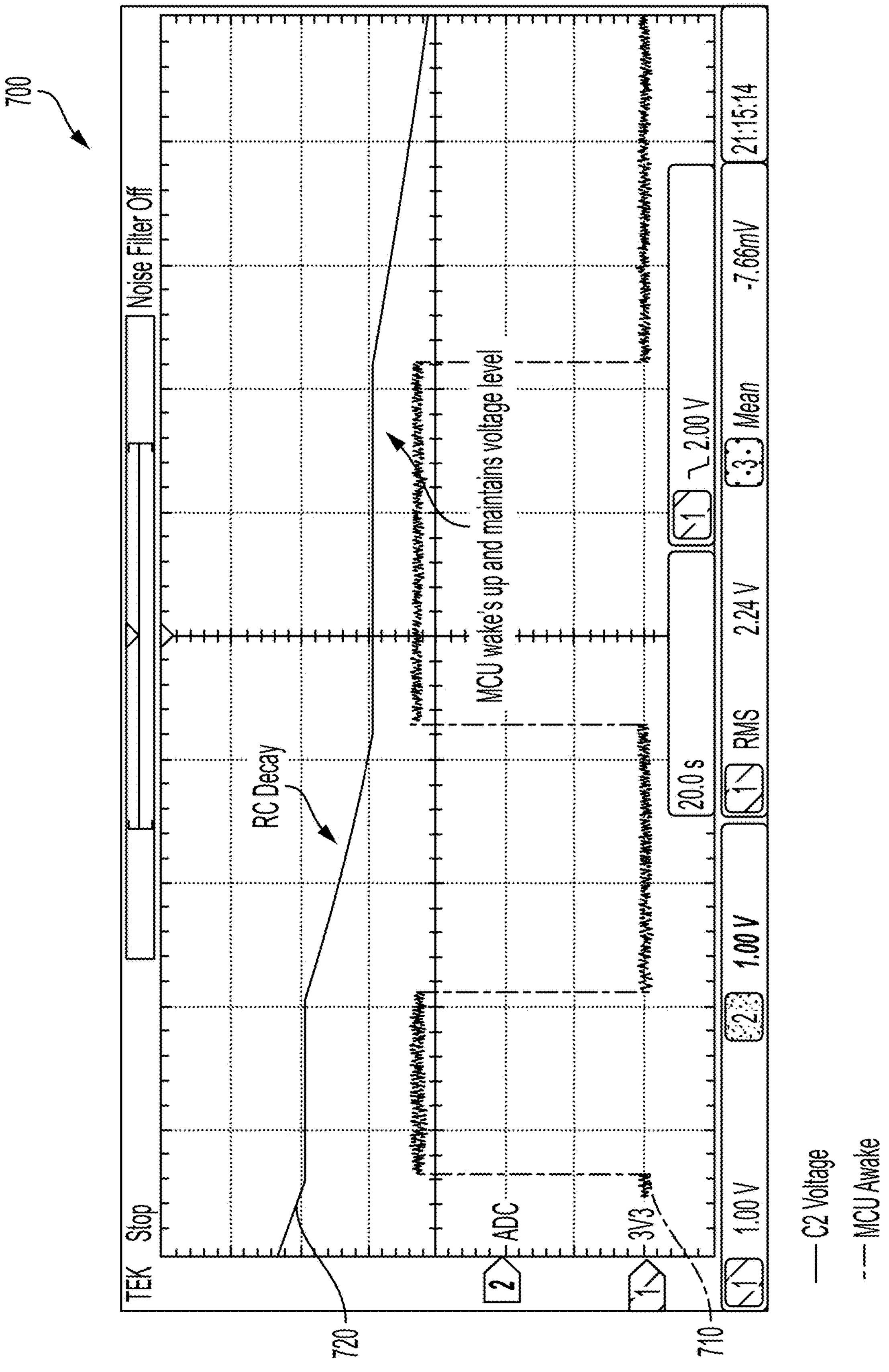
FIG. 6 illustrates a view of operation of the power tool of FIG. 1 across a power off event, according to embodiments described herein.

In some embodiments, the controller 400 determines a temperature of the power tool 10 based on a voltage of the capacitor of the RC circuit included in the circuitry 410 when the controller 400 is powered on after a power off event ends, for example, as depicted in FIG. 6. The power off event includes events such as, a power cycle of the power tool 10, a replacement of the battery pack 200 with another battery pack 200, an idle status, a controller 400 not awake, or the like. FIG. 6 illustrates an oscilloscope view 700 of the controller 400 operating the power tool 10 across power off events. The oscilloscope view 700 includes a first voltage signal 710 and a second voltage signal 720. The first voltage signal 710 is an amount of voltage provided to the controller 400 and indicates a status of the controller 400. For example, the first voltage signal 710 toggles between a low voltage value and a high voltage value, which indicate when the controller 400 is not awake or awake respectively. In this example, the low signal value correlates to an occurrence of a power off event. The second voltage signal 720 is an amount of a voltage stored in a capacitor (e.g., capacitor C1 shown in FIG. 4) of the circuitry 410 across multiple power off events. For example, the second voltage signal 720 indicates the voltage of the capacitor is reduced during the occurrences of power off events due to the capacitor discharging. In this example, the second voltage signal 720 indicates the voltage of the capacitor is maintained when the occurrences of the power off events ends and the controller 400 is awake.

In some embodiments, the voltage of the capacitor of the RC circuit is proportional to a temperature of power tool 10 and a voltage decay rate (e.g., discharge rate) of the capacitor corresponds with a cooling off rate of the power tool 10. For prior power tools, thermal information (e.g., initial temperature condition) is lost during a power off event due to an onboard battery of the power tool 10 failing to power the controller 400. For such power tools, the voltage of the capacitor can provide an updated condition (e.g., a current temperature condition) of the power tool 10, and the controller 400 is configured to determine the temperature of the power tool 10 based on the voltage of the capacitor after the power off event ends.

In some embodiments, the controller 400 determines the temperature of the power tool 10 based on an initial voltage stored in the circuitry 410 and a model (e.g., Cauer thermal network) of a component of the power tool 10. The controller 400 receives a signal representative of a voltage of the capacitor of the RC circuit of the circuitry 410, sets initial starting points (e.g., temperature conditions) of the model based on the voltage, and adjusts or scales the voltage to the temperature determined using the model. The controller 400 estimates a temperature of the power tool 10 using the model and updates the voltage of the capacitor based on a state of the model. After a subsequent power off event ends, the controller 400 is configured to use the updated voltage of the capacitor to set a second set of starting points for the model. Thermal network models based on interconnected thermal resistances and thermal capacitances are generally known in the art for modeling heat transfer behavior of electrical or electromechanical components. For example, patent literature describes Cauer thermal network models that represent thermal behavior using layered thermal resistances and thermal capacitances to estimate component temperature over time (see, e.g., U.S. Pat. No. 12,266,920). The present disclosure is not limited to any specific implementation of a Cauer thermal network, and other thermal modeling techniques may be used.

In some embodiments, the controller 400 determines the temperature of the power tool 10 based on a voltage stored in the circuitry 410 and a current accumulator bucket fill. The controller 400 receives a signal representative of a current provided to the power tool 10. The controller 400 is configured to increment a voltage value of a bucket stored in memory 460 when the received current exceeds a current threshold. The voltage value of the bucket is proportional to a temperature of the power tool 10. The controller 400 is configured to enable an overload of the power tool 10 when the bucket is full.

Figure 7A:
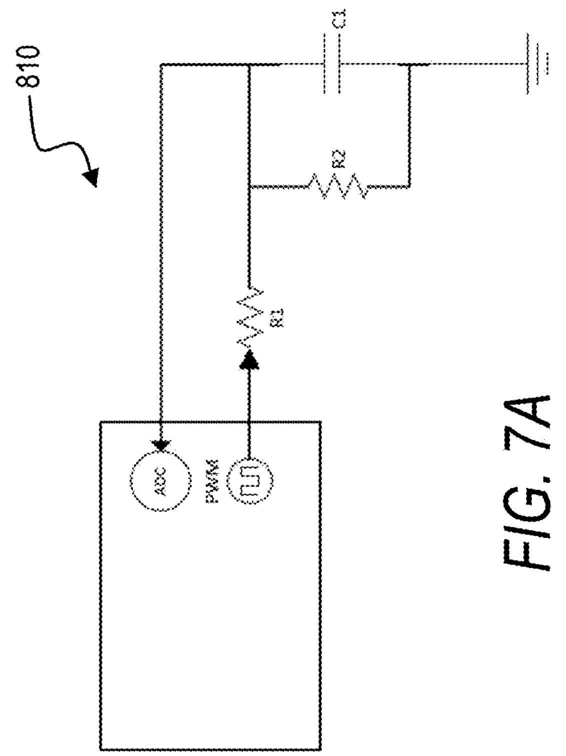
FIGS. 7A, 7B, 7C, and 7D illustrate various circuit diagram configurations for storing thermal information of the power tool of FIG. 1, according to embodiments described herein.
Figure 7B:
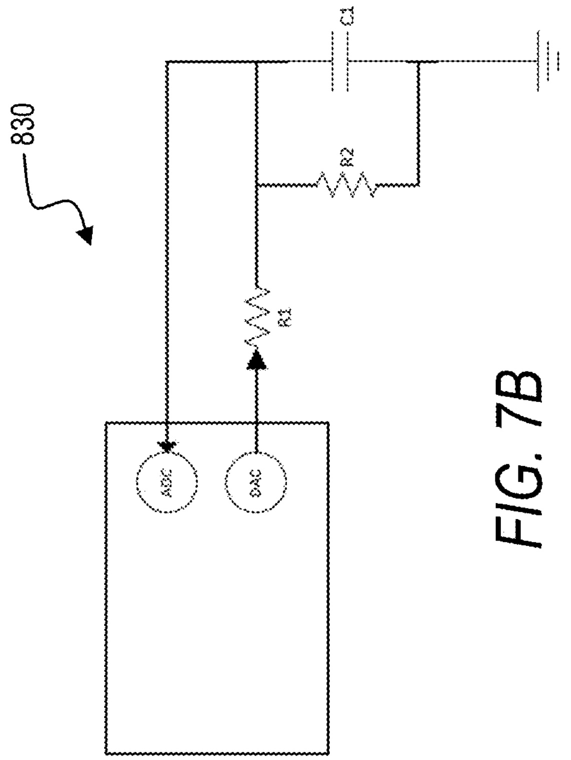

In some embodiments, the controller 400 is configured to control a voltage applied to a capacitor of the circuitry 410 and determine a voltage of the capacitor of the circuitry 410, for example, as depicted in FIGS. 7A-7B. Referring to FIG. 7A, an example controller circuit configuration 810 is depicted for storing thermal information of the power tool 10 of the present disclosure. As depicted in FIG. 7A, the controller 400 is configured to provide a pulse-width modulation ("PWM") signal to the RC circuit arrangement of the circuitry 410 via a first pin of the controller 400. The controller 400 is also configured to read a voltage of the capacitor C1 using an analog-to-digital converter ("ADC") via a second pin of the controller 400. Referring to FIG. 7B, an example controller circuit configuration 830 is depicted for storing thermal information of the power tool 10 of the present disclosure. As depicted in FIG. 7B, the controller 400 is configured to utilize a digital-to-analog converter ("DAC") to provide an analog signal to the RC circuit arrangement of the circuitry 410 via a first pin of the controller 400. The controller 400 is also configured to read a voltage of the capacitor C1 using an analog-to-digital converter ("ADC") via a second pin of the controller 400.

Figure 7C:
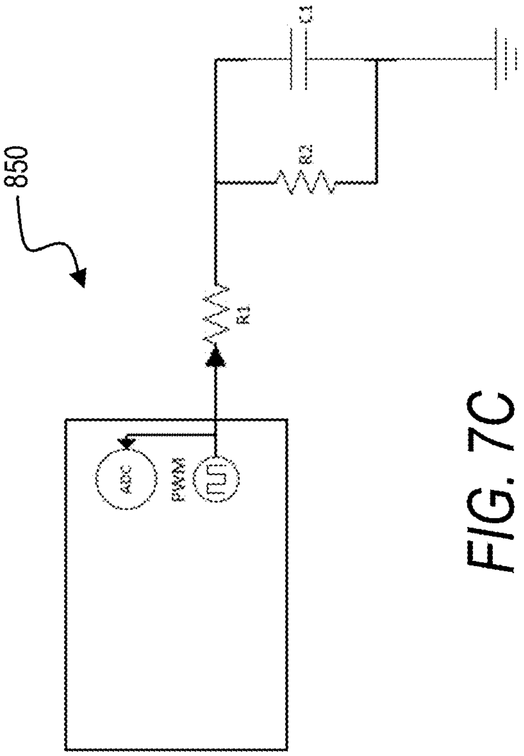
Figure 7D:
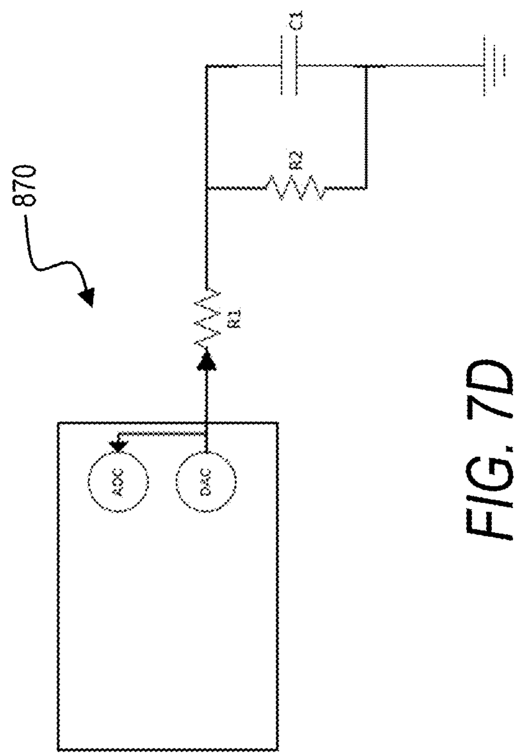

In some embodiments, the controller 400 is configured to control a voltage applied to a capacitor of the circuitry 410 and determine a voltage of the capacitor of the circuitry 410, for example, as depicted in FIGS. 7C-7D. Referring to FIG. 7C, an example controller circuit configuration 850 is depicted for storing thermal information of the power tool 10 of the present disclosure. As depicted in FIG. 7C, the controller 400 includes a multiplexed pin. The controller 400 is configured to provide a PWM signal to the RC circuit arrangement of the circuitry 410 and read a voltage of the capacitor C1 using an analog-to-digital converter ("ADC") via the multiplexed pin of the controller 400. Referring to FIG. 7D, an example controller circuit configuration 870 is depicted for storing thermal information of the power tool 10 of the present disclosure. As depicted in FIG. 7D, the controller 400 a multiplexed pin. The controller 400 is configured to utilize a digital-to-analog converter ("DAC") to provide an analog signal to the RC circuit arrangement of the circuitry 410 and read a voltage of the capacitor C1 using an analog-to-digital converter ("ADC") via the multiplexed pin of the controller 400.

Figure 8:
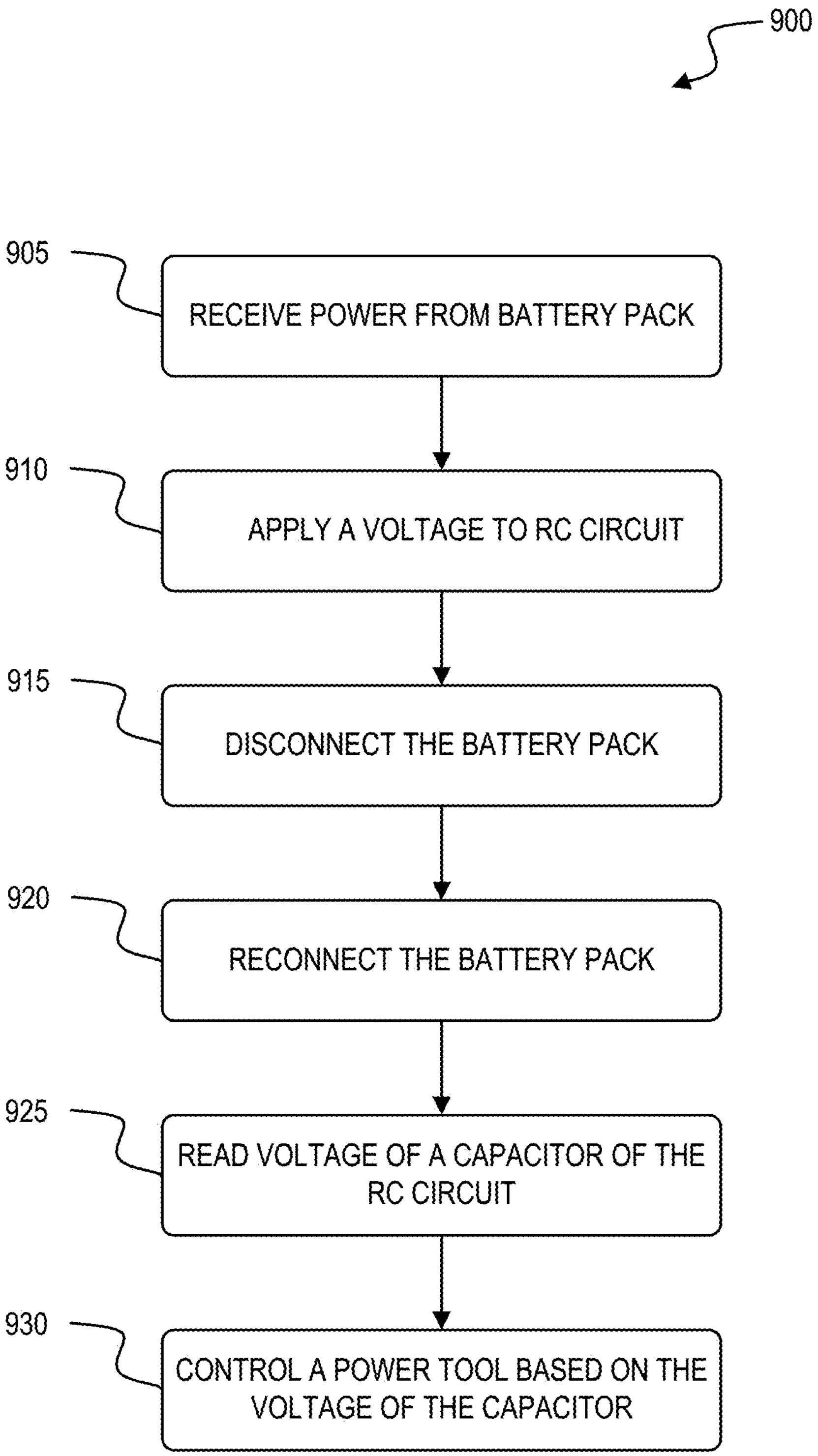
FIG. 8 illustrate a process for controlling the power tool of FIG. 1, according to embodiments described herein.

FIG. 8 illustrates a method 900 executed by the controller 400 of the power tool 10. The controller 400 receives, for example, power from the battery pack 200 (STEP 905). The controller 400 controls a voltage, from the battery pack 200, applied to the circuitry 410 of the power tool 10 (STEP 910). In some embodiments, the controller 400 provides a voltage to a capacitor of a RC circuit arrangement of the circuitry 410 as at least one of an PWM signal or an analog signal. The controller 400 is configured to provide a voltage to a capacitor of a RC circuit arrangement of the circuitry 410 proportional to a temperature of the power tool 10.

In some instances, the battery pack 200 is disconnected from the power tool 10 (STEP 915). In some embodiments, a power off event occurs and the battery pack 200 of the power tool 10 fails to provide a sufficient amount of power to operate the controller 400. In some instances, the battery pack 200 is reconnected to the power tool 10 (STEP 920). In some embodiments, a power off event ends and the battery pack 200 of the power tool 10 provides a sufficient amount of power to operate the controller 400.

The controller 400 reads a voltage of a capacitor of a RC circuit arrangement of the circuitry 410 (STEP 925). In some embodiments, the controller 400 determines a voltage of a capacitor of a RC circuit arrangement of the circuitry 410. In some embodiments, the controller 400 determines a voltage of a capacitor of a RC circuit arrangement of the circuitry 410 in response determining a power off event of the power tool 10 has ended.

The controller 400 controls the power tool 10 based on the voltage of the capacitor of the RC circuit arrangement of the circuitry 410 (STEP 930). In some embodiments, the controller 400 determines a temperature of the power tool 10 based on a voltage of a capacitor of a RC circuit arrangement of the circuitry 410 using the relationship between the voltage of the capacitor and the temperature of the power tool 10. The controller 400 compares the determined temperature of the power tool 10 to a temperature threshold. If, at STEP 930, the controller 400 determines that the determined temperature of the power tool 10 is greater than or equal to the temperature threshold, the controller 400 disables operation of the power tool 10. If, at STEP 930, the controller 400 determines that the determined temperature of the power tool 10 is less than the temperature threshold, the controller 400 continues to monitor/update the voltage of the capacitor of the RC circuit arrangement of the circuitry 410 during operation of the power tool 10.

Figure 9:
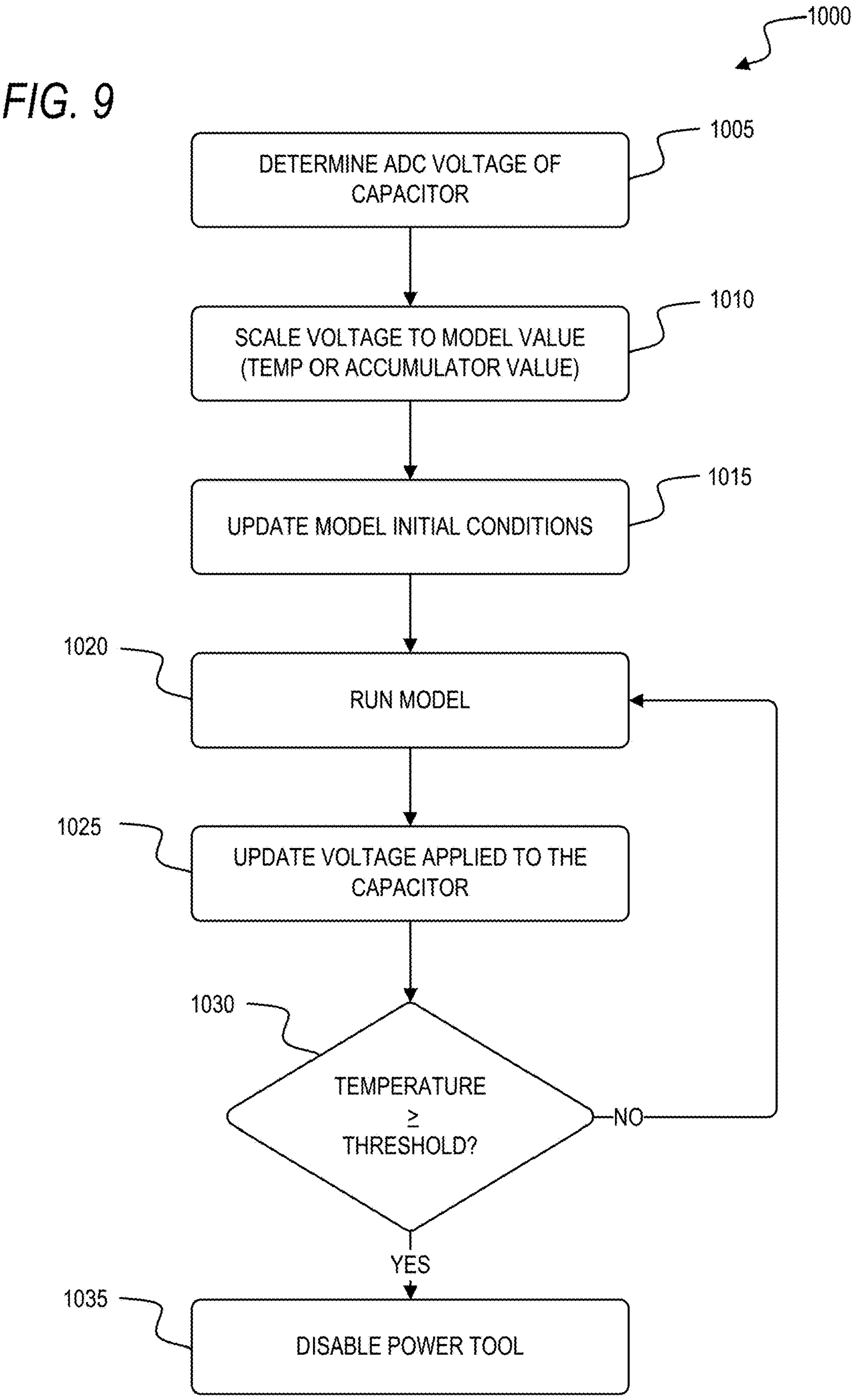
FIG. 9 illustrate a process for updating a model for determining thermal information of the power tool of FIG. 1, according to embodiments described herein.

FIG. 9 illustrates a method 1000 executed by the controller 400 of the power tool 10. The controller 400 determines a voltage of a capacitor of an RC circuit arrangement of the circuitry 410 (STEP 1005). In some embodiments, the controller 400 receives, from a sensor 425, a signal representing a voltage of a capacitor of a RC circuit arrangement of the circuitry 410. The controller 400 scales a voltage of the capacitor of the RC circuit arrangement of the circuitry 410 to a model value (STEP 1010). In some embodiments, the model value is a temperature of the power tool 10 based on Cauer thermal network circuit of the power tool 10. In some embodiments, the model value is an accumulator value of the current accumulator bucket stored in the memory 460. The accumulator value is proportional to a temperature of the power tool 10.

The controller 400 then updates initial conditions of the model (STEP 1015). In some embodiments, the controller 400 sets an initial temperature (e.g., starting point) of the power tool 10 for the model and stores the initial temperature by applying the scaled voltage to the capacitor of the RC circuit arrangement of the circuitry 410. The controller 400 runs the model (STEP 1020). In some embodiments, the controller 400 runs the model to estimate a temperature of the power tool 10 during operation. The controller 400 then updates the voltage applied to the capacitor of the RC circuit arrangement of the circuitry 410 (STEP 1025). In some embodiments, the controller 400 continuously applies the scaled voltage to the capacitor of the RC circuit arrangement of the circuitry 410 during operation of the power tool 10. In some instances, the controller 400 can fail due to a power off event of the power tool 10, which can cause the model to operate with conditions that are inaccurate. In those instances, the controller 400 determines a voltage of the capacitor of the RC circuit arrangement of the circuitry 410 after the power off event of the power tool 10 ends and updates (i.e., sets another starting point) the initial conditions of the model based on a temperature proportional the voltage of the capacitor.

The controller 400 controls the power tool 10 based on a temperature of the power tool 10 provided by the model (STEP 1030). In some embodiments, the controller 400 determines a temperature of the power tool 10 based on the model of the power tool 10. The controller 400 compares the determined temperature of the power tool 10 to a temperature threshold. If, at STEP 1030, the controller 400 determines that the determined temperature of the power tool 10 is greater than or equal to the temperature threshold, the controller 400 disables operation of the power tool 10 (STEP 1035). If, at STEP 1030, the controller 400 determines that the determined temperature of the power tool 10 is less than the temperature threshold, the controller 400 continues to run the model and update the voltage of the capacitor of the RC circuit arrangement of the circuitry 410 during operation of the power tool 10.

Thus, embodiments described herein provide, among other things, devices, methods, and systems for maintaining thermal information of a power tool during a power off event. Various features and advantages are set forth in the following claims.

What is claimed is:

1. A power tool comprising:

a housing including a battery pack interface configured to receive a battery pack;

an electrical circuit including a resistor-capacitor ("RC") circuit arrangement configured to store a voltage on a capacitor of the RC circuit arrangement, wherein the voltage is proportional to a temperature of the power tool; and an electronic controller, connected to the electrical circuit, including an electronic processor and a memory, the electronic controller configured to:

control a voltage, from the battery pack, applied to the RC circuit arrangement, determine, in response to determining a power off event of the power tool has ended, the temperature of the power tool based on the voltage of the capacitor of the RC circuit arrangement, and control the power tool based on the voltage of the capacitor of the RC circuit arrangement and a temperature threshold.

2. The power tool of claim 1, wherein the power tool includes one or more components, and wherein the temperature of the power tool is based on a temperature of a component of the one or more components of the power tool.

3. The power tool of claim 2, wherein a voltage decay rate of the RC circuit arrangement is based on a cooling off rate of the component of the one or more components of the power tool.

4. The power tool of claim 1, wherein a voltage decay rate of the RC circuit arrangement is based on a cooling off rate of the power tool.

5. The power tool of claim 1, wherein, to apply the voltage from the battery pack to the RC circuit arrangement, the electronic controller is further configured to:

charge the capacitor of the RC circuit arrangement using at least one of a pulse width modulation ("PWM") output or a digital-to-analog converter ("DAC") output.

6. The power tool of claim 5, wherein the at least one of the PWM output or the DAC output is a percentage of a defined temperature.

7. The power tool of claim 1, wherein, to control the power tool based on the voltage of the capacitor of the RC circuit arrangement and the temperature threshold, the electronic controller is further configured to:

disable, in response to determining the voltage of the capacitor of the RC circuit arrangement is greater than or equal to the temperature threshold, the power tool.

8. A method for maintaining thermal information of a power tool during a power off event, the method comprising:

receiving voltage from a battery pack connected to the power tool;

providing, by an electronic controller, the voltage from the battery pack to a resistor-capacitor ("RC") circuit arrangement, the RC circuit arrangement including a capacitor storing a voltage that is proportional to a temperature of the power tool;

determining, by the electronic controller and in response to determining the power off event of the power tool has ended, the temperature of the power tool based on the voltage of the capacitor of the RC circuit arrangement; and controlling the power tool based on the voltage of the capacitor of the RC circuit arrangement and a temperature threshold.

9. The method of claim 8, further comprising:

determining a voltage of the capacitor;

scaling the voltage of the capacitor to a model value;

updating model initial conditions;

running the model; and updating the voltage applied to the capacitor, wherein the power tool includes one or more components, and wherein the temperature of the power tool is based on a temperature of a component of the one or more components of the power tool.

10. The method of claim 9, wherein a voltage decay rate of the RC circuit arrangement is based on a cooling off rate of the component of the one or more components of the power tool.

11. The method of claim 8, wherein a voltage decay rate of the RC circuit arrangement is based on a cooling off rate of the power tool.

12. The method of claim 8, wherein providing the power voltage from the battery pack to the RC circuit arrangement includes charging the capacitor of the RC circuit arrangement using at least one of a pulse width modulation ("PWM") output or a digital-to-analog converter ("DAC") output.

13. The method of claim 12, wherein the at least one of the PWM output or the DAC output is a percentage of a defined temperature.

14. The method of claim 8, wherein controlling the power tool based on the voltage of the capacitor of the RC circuit arrangement and the temperature threshold includes disabling, in response to determining the voltage of the capacitor of the RC circuit arrangement is greater than or equal to the temperature threshold, the power tool.

15. A system for maintaining thermal information of a power tool during a power off event, the system comprising:

a battery pack;

an electrical circuit including a resistor-capacitor ("RC") circuit arrangement, the RC circuit arrangement configured to store a voltage on a capacitor of the RC circuit arrangement, wherein the voltage is proportional to a temperature of the power tool; and an electronic controller electrically connected to the electrical circuit, the electronic controller including an electronic processor and a memory, the memory including a model for an estimated temperature of the power tool, the estimated temperature of the model is proportional to the voltage of the capacitor of the RC circuit arrangement, the electronic controller configured to:

control a voltage, from the battery pack, applied to the RC circuit arrangement, determine a first voltage of the capacitor of the RC circuit arrangement, the first voltage being an initial voltage measurement, determine a first estimated temperature of the power tool based on the first voltage of the capacitor of the RC circuit arrangement, update a state of the model based on the first voltage of the capacitor of the RC circuit arrangement, determine, in response to determining the power off event of the power tool ended, a second voltage of the RC circuit arrangement, determine a second estimated temperature of the power tool based on the second voltage of the capacitor of the RC circuit arrangement, and control operation of the power tool based on the second estimated temperature of the power tool and a temperature threshold value.

16. The system of claim 15, wherein the power tool includes one or more components, and wherein the estimated temperature of the power tool is based on a temperature of a component of the one or more components of the power tool.

17. The system of claim 16, wherein a voltage decay rate of the RC circuit arrangement is based on a cooling off rate of the component of the one or more components of the power tool.

18. The system of claim 15, wherein a voltage decay rate of the RC circuit arrangement is based on a cooling off rate of the power tool.

19. The system of claim 15, wherein, to control the voltage applied to the RC circuit arrangement, the electronic controller is further configured to:

charge the capacitor of the RC circuit arrangement using at least one of a pulse width modulation ("PWM") output or a digital-to-analog converter ("DAC") output.

20. The system of claim 15, wherein the electronic controller is further configured to update the state of the model based on the second voltage of the capacitor of the RC circuit arrangement.

* * * * *